(12) United States Patent
Maciel

(10) Patent No.: US 7,975,896 B2
(45) Date of Patent: Jul. 12, 2011

(54) FRICTION PLUG WELDING METHODS AND SYSTEMS

(75) Inventor: Marcio Fernandes Maciel, Sao Jose dos Campos (BR)

(73) Assignee: Embraer—Empresa Brasileira de Aeronautica S.A., Sao Jose Dos Campos (BR)

( * ) Notice: Subject to any disclaimer, the term of this patent is extended or adjusted under 35 U.S.C. 154(b) by 0 days.

(21) Appl. No.: 12/634,654

(22) Filed: Dec. 9, 2009

(65) Prior Publication Data

US 2010/0084454 A1 Apr. 8, 2010

Related U.S. Application Data

(62) Division of application No. 12/014,737, filed on Jan. 15, 2008, now Pat. No. 7,726,541.

(51) Int. Cl.
*B23K 20/12* (2006.01)
(52) U.S. Cl. ............................ 228/2.1; 228/2.3; 428/544
(58) Field of Classification Search ........................ None
See application file for complete search history.

(56) References Cited

U.S. PATENT DOCUMENTS

| | | | |
|---|---|---|---|
| 3,477,115 A | 11/1969 | Martin | |
| 3,848,389 A * | 11/1974 | Gapp et al. | 411/504 |
| 5,492,264 A | 2/1996 | Wadleigh | |
| 5,975,406 A | 11/1999 | Mahoney et al. | |
| 6,213,379 B1 | 4/2001 | Takeshita et al. | |
| 6,327,766 B1 | 12/2001 | Cardente | |
| 6,843,405 B2 | 1/2005 | Okamoto et al. | |
| 7,080,438 B2 * | 7/2006 | Murakami | 29/428 |
| 7,530,487 B2 | 5/2009 | Kyriakoglou | |
| 2001/0038028 A1 * | 11/2001 | Iwashita | 228/112.1 |
| 2002/0027156 A1 | 3/2002 | Coletta et al. | |
| 2002/0066768 A1 | 6/2002 | Foster et al. | |
| 2002/0125297 A1 | 9/2002 | Stol et al. | |
| 2003/0201306 A1 * | 10/2003 | McTernan et al. | 228/112.1 |
| 2003/0218053 A2 * | 11/2003 | Litwinski et al. | 228/112.1 |
| 2004/0016111 A1 | 1/2004 | Mueller et al. | |
| 2004/0118900 A1 * | 6/2004 | Stevenson et al. | 228/114.5 |
| 2004/0129762 A1 * | 7/2004 | Stevenson et al. | 228/112.1 |
| 2004/0232209 A1 * | 11/2004 | Stol et al. | 228/112.1 |
| 2005/0173492 A1 | 8/2005 | Workman et al. | |
| 2005/0178816 A1 * | 8/2005 | Stevenson et al. | 228/112.1 |

(Continued)

FOREIGN PATENT DOCUMENTS

JP 2007270889 A 10/2007

*Primary Examiner* — Kiley Stoner
(74) *Attorney, Agent, or Firm* — Nixon & Vanderhye P.C.

(57) ABSTRACT

Friction plug welding methods and systems plug a hole extending through a component part from front and back faces thereof. A sacrificial plate having an opening therethrough may be positioned against the back face of the component part with assistance from a restraint part (which is also preferably provided with a space of sufficient dept to receive a terminal end of the male plug) so that the opening is coaxially aligned with the hole to be plugged. Upon advancing a male plug of a plug rod into the hole under friction plug welding conditions, a friction weld region will therefore be formed between the male plug and defining surfaces of both the hole extending through the component part and the opening extending through the sacrificial plate. The plug rod may include an annular shoulder flange which defines a plane parallel to the front face of the component part so that flash flow from the friction welding will be displaced laterally of the hole. The male plug may be frustroconically shaped. An annular arcuate surface may also be provided which joins the male plug to the shoulder flange.

11 Claims, 3 Drawing Sheets

U.S. PATENT DOCUMENTS

| | | |
|---|---|---|
| 2006/0096091 A1 | 5/2006 | Carrier |
| 2006/0131364 A1 | 6/2006 | Bouet et al. |
| 2006/0175381 A1* | 8/2006 | Wang et al. ................. 228/112.1 |
| 2008/0006678 A1* | 1/2008 | Packer et al. .............. 228/114.5 |

* cited by examiner

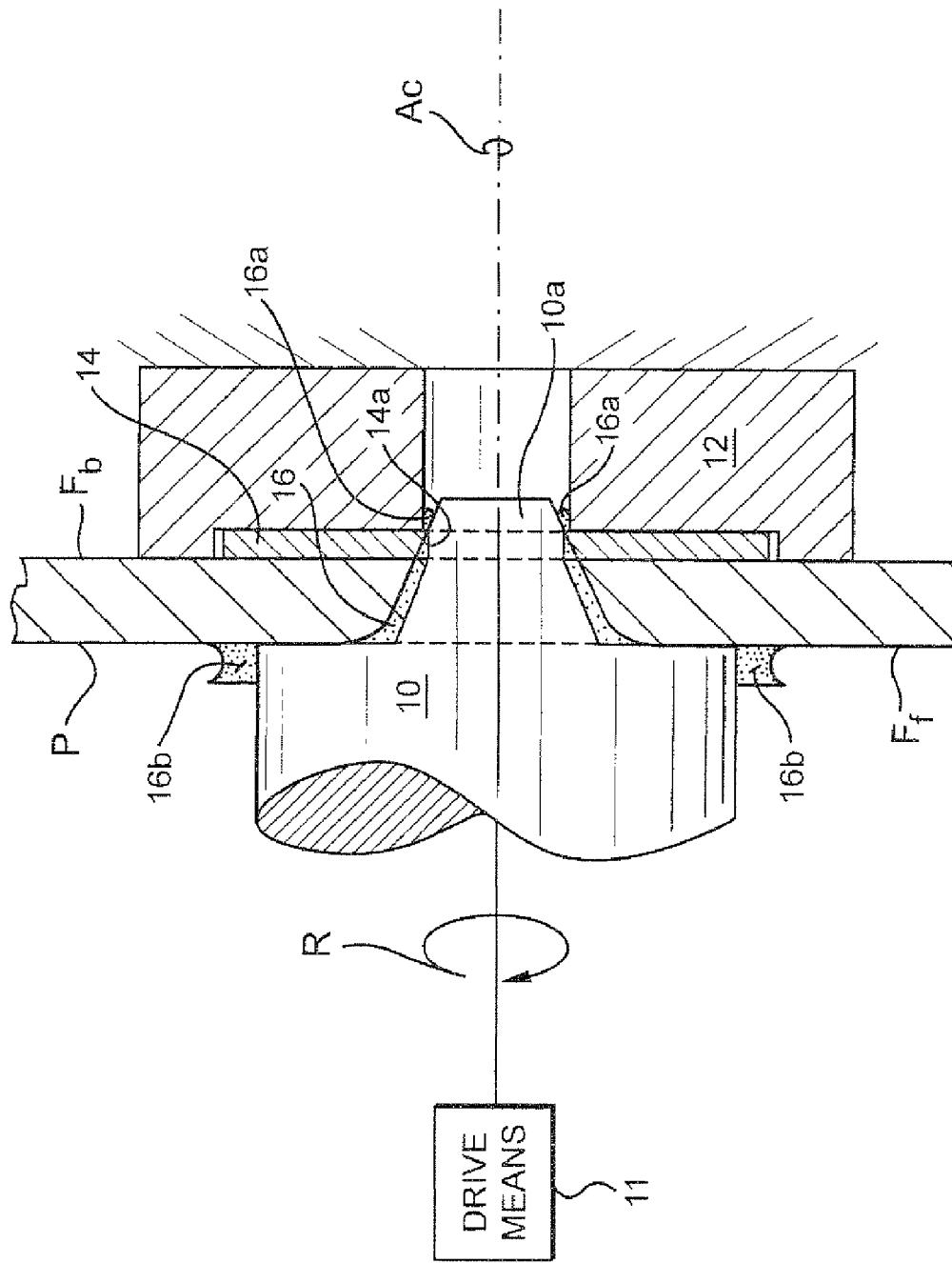

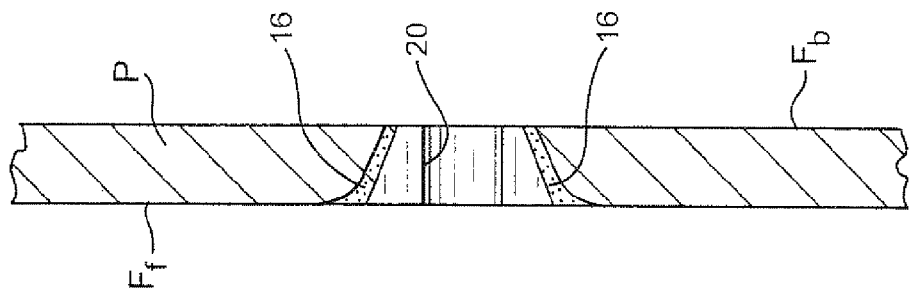
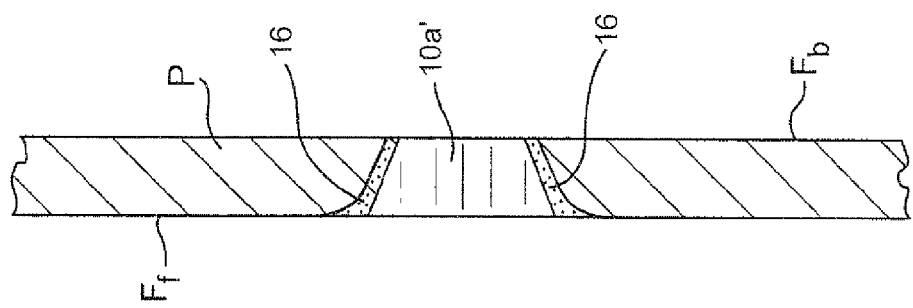
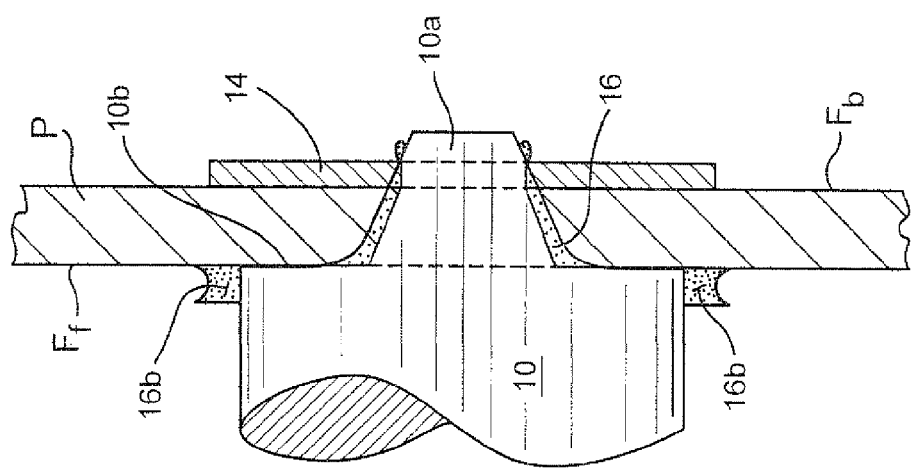

FRICTION PLUG WELDING METHODS AND SYSTEMS

CROSS-REFERENCE

This application is a divisional of commonly owned U.S. application Ser. No. 12/014,737, filed Jan. 15, 2008 (now U.S. Pat. No. 7,726,541), the entire content of which is hereby incorporated by reference.

FIELD OF THE INVENTION

The present invention relates generally to welding methods and systems. In preferred forms, the present invention relates to friction plug welding to plug a hole in a component part wherein a tapered male plug is insertable within and friction welded to the defining surfaces of the hole.

BACKGROUND AND SUMMARY OF THE INVENTION

Friction plug welding is a well known technique whereby through holes in component parts (especially metal parts) may be filled with a similar material so as to retain substantially the mechanical characteristics of the part. For example, in U.S. Patent Application Publication 2006/0131364 published on Jun. 22, 2006 (the entire content of which is expressly incorporated hereinto by reference), a friction plug welding technique is disclosed which employs a restraint part which defines a blind cavity axially aligned with the hole to be plugged so as to receive a terminal end of the male plug during the welding operation. The bottom surface of the cavity serves as a limit stop for the maleF plug and receives a flash flow of weld mix material exiting the hole at the back face of the component part that is generated during welding. Excessive flash flow may also be generated at the front face of the component part. Such flash flow can be undesirable as it may lead to annular weld defects at the front and back faces of the component part.

It would therefore be desirable if friction plug welding techniques could be provided which minimize (if not eliminate entirely) such annular weld defects. It is towards providing such solutions that the present invention is directed.

A friction plug welding methods and systems are provided so as to plug a hole extending through a component part from front and back faces thereof. In some embodiments a sacrificial plate having an opening therethrough will be positioned against the back face of the component part so that the opening is coaxially aligned with the hole to be plugged. Upon advancing a male plug of a plug rod into the hole under friction plug welding conditions, a friction weld region will therefore be formed between the male plug and defining surfaces of both the hole extending through the component part and the opening extending through the sacrificial plate.

In certain advantageous embodiments, a plug rod is provided with an annular shoulder flange which defines a plane parallel to the front face of the component part. Thus, advancement of the male plug of the plug rod into the hole will cause the annular shoulder flange to be adjacent to a corresponding region of the front face surrounding the hole. As such, flash flow from the friction welding will be displaced laterally of the hole. The male plug is preferably tapered, that is having a frustroconical shape. An annular arcuate surface may also be provided which joins the male plug to the shoulder flange.

According to some embodiments, the sacrificial plate will be positioned against the back face of the component part with a restraint part. The restraint part may be provided with a recessed region which is open adjacent to the back face of the component part and which is sized and configured to receive the sacrificial plate therein. The restraint part may also be provided with a space (e.g., a through hole or recessed cavity) of sufficient depth for receiving a terminal end portion of the male plug therein during the friction plug welding.

It is usually preferred that the male plug and the sacrificial plate are each formed of the same or a compatibly similar material as that of the component part.

Following a friction plug welding operation, the plug rod and the sacrificial plate may be removed from the component part along respective planes coincident with the front and back faces thereof. When removed, therefore, a segment of the male plug will be positioned as a plug within the hole and is welded to the component part. A new hole may thus be formed through the remaining segment of the male plug.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein;

FIG. 2 is a schematic cross-sectional diagram of an embodiment of a friction plug welding technique similar to FIG. 1, but shown in a state at the end of the welding operation; and FIGS. 3A through 3C progressively depict the manner in which a plug-welded hole may be dressed and re-drilled.

DETAILED DESCRIPTION OF THE INVENTION

Figure 1:
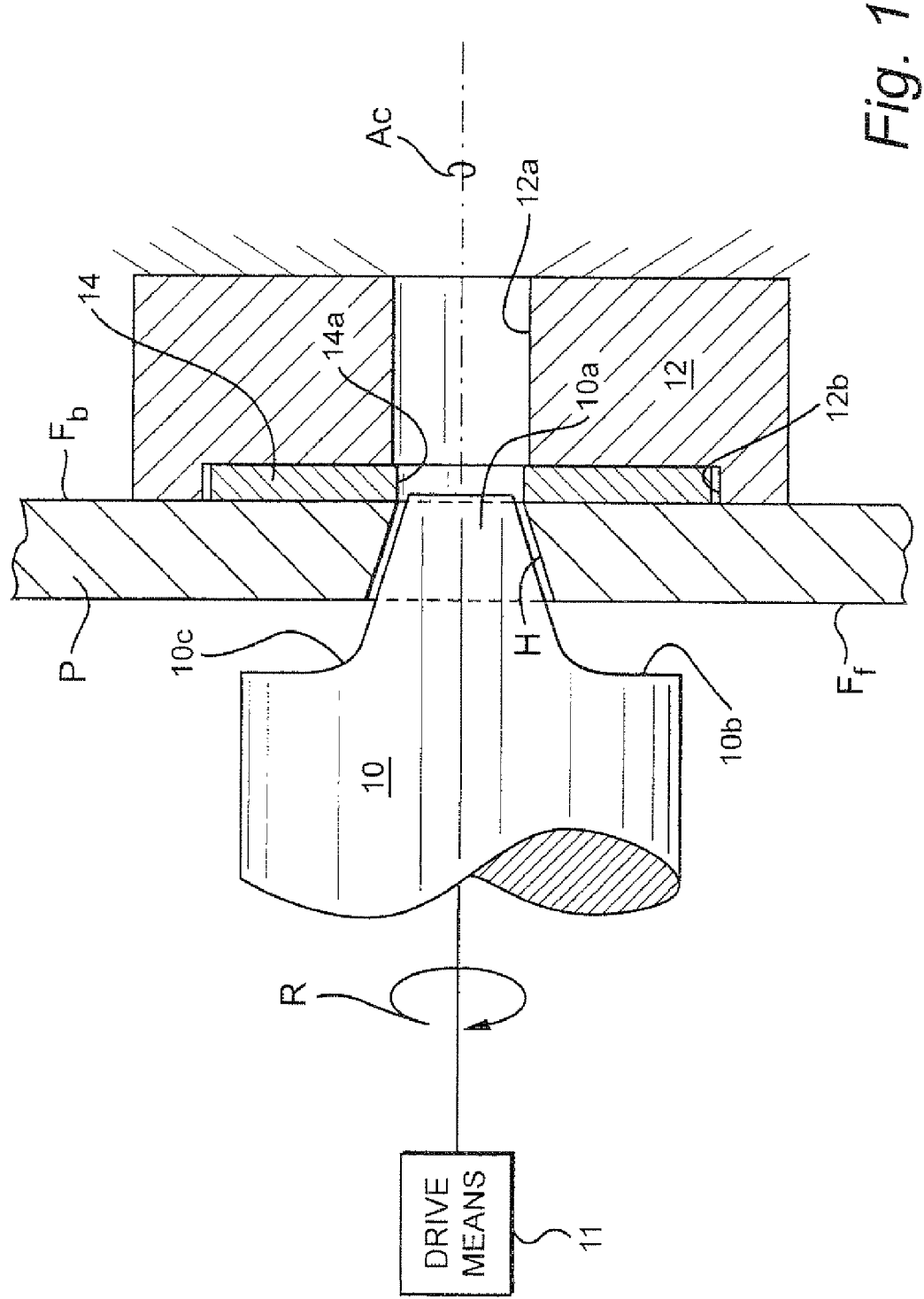
FIG. 1 is a schematic cross-sectional diagram of an embodiment of a friction plug welding technique according to the present invention shown in a state at the beginning of the welding operation.

Accompanying FIGS. 1 and 2 show a plug welding technique which embodies the present invention. In this regard, a component part P has a through hole H defined between the part's front and back faces $F_f$ and $F_b$ which is intended to be plugged. As is conventional in practice, the hole H will have been previously worked by appropriate machining techniques so as to correct any shape deficiencies that may exist and to establish a substantially frustroconical configuration having a central axis $A_c$.

A cylindrical plug rod 10 is provided having at its terminal end a male plug 10a having a frustroconical shape that is substantially conforms to the frustroconical shape of the hole H. The male plug 10a is preferably formed of a compatible (if not the same) material as the material of the component part P. In this regard, although the component part P and the male plug 10a may be formed of a metal (e.g., aluminum alloy), it is also conceivable that they may be formed of compatible non-metallic materials, such as thermoplastics or resin composite materials. Thus, while the drawings depict metallic materials, the techniques disclosed herein are equally applicable to non-metallic materials.

The plug rod 10 defines an annular shoulder flange 10b which is joined to the male plug 10a by a concavely arcuate annular surface 10c. The annular surface 10c thus provides a smooth transition between the frustroconical male plug 10a and the should flange 10b, the latter defining a plane which is parallel to the front face $F_f$ of the component part P.

A restraint part 12 is provided on the back face $F_b$ and defines a space 12a. The space 12a need not be provided as a through aperture as shown in FIGS. 1 and 2, but instead may be provided as a blind cavity. Whether in the form of a through aperture or a blind cavity, the space 12a will have sufficient depth to receive a terminal end of the male plug 10a when performing a friction welding operation. The restraint part 12 also includes an annular recessed region 12b which is coaxially aligned relative to the central axis $A_c$ with the aperture 12a and is open adjacent to the back face $F_b$ of component part P.

The recessed region 12b is sized and configured to receive therein a sacrificial plate 14 formed of the same or compatibly similar material as the component part P and the male plug 10a. The sacrificial plate 14 defines a opening 14a therethrough which is aligned coaxially with the hole H and aperture 12a relative to the central axis $A_c$. The opening 14a has a diameter which is at least the same or somewhat less than the diameter of the hole H at the back face $F_b$ of the component part P. The aperture 12a, on the other hand, most preferably has a diameter which is greater than that of the opening 14a.

During a welding operation, the plug rod 10, and hence the male plug 10a thereof, is coaxially aligned with the central axis $A_c$ and brought into contact with the defining surfaces of the hole H while being rotated about the central axis $A_c$ (arrow R) by a suitable drive means 11. Friction between the defining surfaces of the male plug 10a, the hole H and the opening 14a will cause their respective materials to melt and flow together while melted to form a weld region 16 therebetween (see FIG. 2).

It will be especially observed that the weld region 16 extends to and includes a portion of the sacrificial plate 14 surrounding the opening 14a. As such, the weld region extends into the aperture 12a of the so that flash regions 16a are not immediately adjacent the back face $F_b$ of the component part P. In such a manner, weld defects (e.g., annular regions of incomplete welding) are minimized (if not avoided entirely) since the weld region 16 unitarily extends beyond the face $F_b$ of the component part P.

At the front face $F_f$, the flash flow of melt material is directed laterally by means of the annular shoulder flange 10b of the plug rod 10 so that flash regions 16b are formed at a radially displaced location on the front face $F_f$. The regions 16a are therefore not located immediately adjacent the hole H at the front face $F_f$ and in a manner similar to the location of the flash regions 16a annular weld defects are minimized (if not eliminated entirely). Following the welding operation, the plug rod 10, component part P and the sacrificial plate 14 are thus welded one to another via the weld region 16.

Accompanying FIGS. 3A through 3C depict the manner in which the plug-welded hole H may be dressed and re-drilled. In this regard, FIG. 3A depicts a state wherein the welded plug rod 10, component part P and sacrificial plate 14 are removed from the welding machine (e.g., removed from the restraint part 12). The plug rod 10 and the sacrificial plate 14 may be removed from the component part P by cutting such structures along planes coincident with the front and back faces $F_f$, $F_b$, respectively. As shown in FIG. 3B, once such structures are removed, the plugged hole H will be comprised of a residual segment of the male plug 10a (designated 10a' in FIG. 3B) and the remaining part of the weld region 16. The plugged hole H may then be re-drilled to form a new properly sized hole H' as shown in FIG. 3C. The thus renovated component part P may then be placed back into service.

It will be understood that, while some directional language (e.g., "front" and "back") has been employed for purposes of discussion above and will be present in the claims below, such language is nonlimiting to the present invention. Thus, it is intended that the front and back surfaces $F_f$ and $F_b$ of the component part P connote the relative orientation between the plug rod 10 and the sacrificial plate 14 and thus does not necessarily correspond to the technical "front" and "back" of the component part P.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A friction plug welding system to plug a hole extending through a component part from front and back faces thereof, the system comprising:
    a sacrificial plate having an opening therethrough
    a restraint part having a recessed region which is open adjacent to the back face of the component part and which is sized and configured to receive the sacrificial plate therein for positioning the sacrificial plate against the back face of the component part so that the opening thereof is coaxially aligned with the hole to be plugged; and
    a plug rod having a male plug capable of being advanced into the hole under friction plug welding conditions to cause a friction weld region to be formed between the male plug and defining surfaces of both the hole extending through the component part and the opening extending through the sacrificial plate.

2. The system of claim 1, wherein the plug rod comprises an annular shoulder flange which defines a plane parallel to the front face of the component part, wherein the male plug of the plug rod is capable of being advanced into the hole so that the annular shoulder flange is adjacent a corresponding region of the front face surrounding the hole to cause flash flow from the friction welding to be displaced laterally of the hole.

3. The system of claim 1, wherein the restraint part includes a space for receiving a terminal end portion of the male plug therein during the friction plug welding.

4. The system of claim 1, wherein the male plug and the sacrificial plate are each formed of the same or a compatible material as the component part.

5. The system of claim 1, wherein the male plug has a frustroconical shape.

6. The system of claim 2, wherein the plug rod further comprises an arcuate concave surface joining the male plug to the shoulder flange.

7. The system of claim 1, wherein the plug rod comprises:
    an outwardly extending terminal male plug; and
    an annular shoulder flange which defines a plane parallel to the front face of the component part, wherein
    the plug rod is capable of orientation relative to the component part so the male plug is coaxially positioned with the hole and the annular shoulder flange is positioned parallel to the front face thereof.

8. The system of claim 7, wherein the male plug has a frustroconical shape.

9. The system of claim 8, wherein the plug rod further comprises an arcuate concave surface joining the male plug to the shoulder flange.

10. The system of claim 7, wherein the restraint part includes a space for receiving a terminal end portion of the male plug therein during the friction plug welding.

11. The system of claim 7, wherein the male plug and the sacrificial plate are each formed of the same or a compatible material as the component part.

\* \* \* \* \*